(12) United States Patent
Ergin et al.

(10) Patent No.: US 10,218,273 B2
(45) Date of Patent: Feb. 26, 2019

(54) ON DIE VOLTAGE REGULATION WITH DISTRIBUTED SWITCHES

(71) Applicants: Advanced Micro Devices, Inc., Sunnyvale, CA (US); ATI Technologies ULC, Markham (CA)

(72) Inventors: Erhan Ergin, Austin, TX (US); Dipanjan Sengupta, Mississauga (CA); Elsie Lo, Thornhill (CA); Stephen V. Kosonocky, Ft. Collins, CO (US); Sree Rajesh Saha, Bangalore (IN); Divya Guruja, Bangalore (IN)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 15/632,765

(22) Filed: Jun. 26, 2017

(65) Prior Publication Data

US 2018/0374853 A1    Dec. 27, 2018

(51) Int. Cl.
H02M 3/158    (2006.01)

(52) U.S. Cl.
CPC ....... *H02M 3/1584* (2013.01); *H02M 3/1588* (2013.01); *H02M 3/158* (2013.01)

(58) Field of Classification Search
CPC ... H02M 3/1584; H02M 3/158; H02M 3/1588
See application file for complete search history.

(56) References Cited

U.S. PATENT DOCUMENTS

| 6,995,995 | B2* | 2/2006 | Zeng | H02M 3/07 327/536 |
|---|---|---|---|---|
| 7,619,402 | B1 | 11/2009 | Kwong | |
| 7,987,441 | B2 | 7/2011 | Frenkil et al. | |
| 8,441,149 | B2 | 5/2013 | Trivedi et al. | |
| 8,561,004 | B2 | 10/2013 | Kosonocky | |
| 8,949,645 | B2 | 2/2015 | Ahmad et al. | |

(Continued)

FOREIGN PATENT DOCUMENTS

WO    2016138361 A1    9/2016

OTHER PUBLICATIONS

Foreign Search Report and Written Opinion in PCT/US2018/039306, dated Oct. 26, 2018, 11 pages.

*Primary Examiner* — Kyle J Moody
(74) *Attorney, Agent, or Firm* — Zagorin Cave LLP (57) ABSTRACT

A distributed voltage regulator has switches that function as resistors and are distributed in rows in a grid pattern across a regulated voltage domain. The switches receive an unregulated voltage and supply the regulated voltage. Switch control lines selectively enable the switches to achieve the desired voltage regulation. Droop detect circuits are also distributed through regulated voltage domain. The droop detect circuits detect when the regulated voltage is below a threshold and supply droop detect signals indicative thereof. A plurality of select circuits receive a first group of control lines to configure the switches for charge injection in response to a droop condition and a second group of control lines to configure the switches for other voltage regulation. The select circuits select one of the first and second group of control lines as switch control lines to configure the switches based on the droop detect signals.

20 Claims, 7 Drawing Sheets

(56) References Cited

U.S. PATENT DOCUMENTS

| | | | |
|---|---|---|---|
| 9,331,690 B2* | 5/2016 | Choi | H03K 17/693 |
| 9,800,150 B2* | 10/2017 | Marsili | H02M 3/158 |
| 2007/0176671 A1* | 8/2007 | Ishida | H02M 3/07 |
| | | | 327/536 |
| 2008/0315848 A1 | 12/2008 | Meyer | |
| 2010/0066343 A1 | 3/2010 | Watt et al. | |
| 2016/0282889 A1* | 9/2016 | Mahajan | G05F 1/575 |
| 2016/0342166 A1 | 11/2016 | Rodriguez et al. | |
| 2016/0342185 A1 | 11/2016 | Rodriguez et al. | |

\* cited by examiner

ON DIE VOLTAGE REGULATION WITH DISTRIBUTED SWITCHES

BACKGROUND

Description of the Related Art

Figure 1:
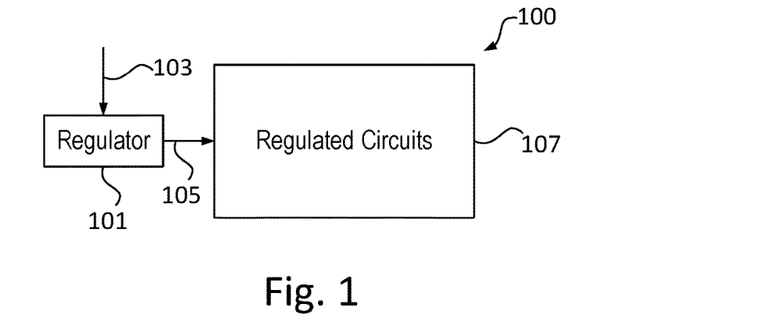
FIG. 1 illustrates a monolithic on-die voltage regulator.

On die voltage regulation is a technique that is commonly used to lower power consumption and at the same time reduce system cost. On die regulators often use a monolithic structure placed next to the logic utilizing power being regulated. FIG. 1 illustrates a high level block diagram of such a structure. The system 100 includes a regulator 101 that regulates a voltage 103 and supplies a regulated voltage 105 to circuits 107 using the regulated voltage. The circuits 107 may be, e.g., a central processing unit (CPU) core. A regulator scheme is described in application Ser. No. 14/720,385, filed May 22, 2015, entitled "Droop Detection for Low-Dropout Regulator" naming Miguel Rodriguez et al. as inventors, Pub. No.: US 2016/0342166, which application is incorporated by reference herein. The regulation scheme includes a first slow control loop to control regulation for voltage changes due to such factors as temperature or power control settings. The regulation scheme includes a faster control loop to respond to sudden transient loading. The regulation scheme includes a droop detector to detect when the regulated voltage drops below a predetermined droop threshold due to sudden transient loading and responds quickly by injecting additional charge to maintain the regulated voltage within a tolerable margin.

However, the monolithic regulator has limited range due to the impedance of the power delivery network. In order to reduce the impedance, implementations using monolithic regulators typically utilize package planes to receive the regulated voltage from the regulator and distribute the regulated voltage. However, even low resistive package planes have a range of only approximately 4000-5000 microns in current process technologies before the regulator loses its effectiveness due to IR drop across the package plane.

Figure 2A:
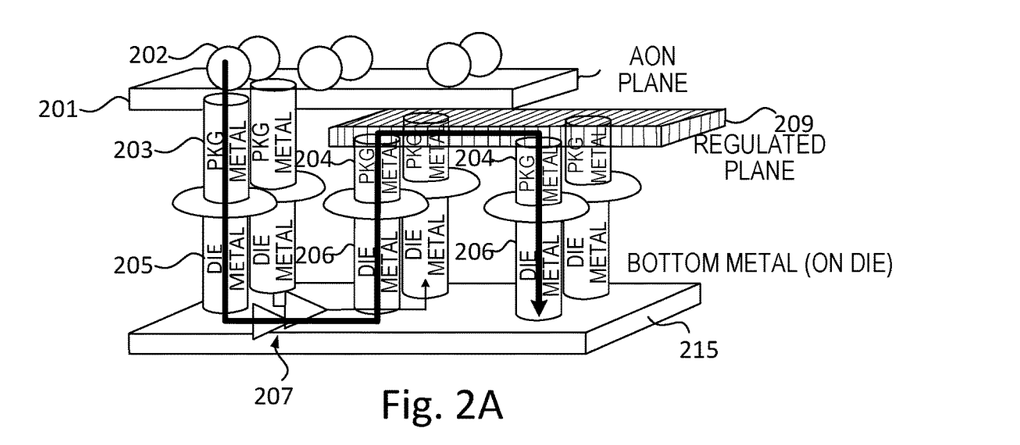
FIG. 2A illustrates additional details of an existing monolithic regulation scheme.

FIG. 2A illustrates an existing regulation scheme. The always on (AON) package plane 201 receives power through bumps 202. The input to the regulator comes from the always on (AON) package plane 201 through package metal 203 and die metal 205 to the regulator logic 207. For ease of illustration, FIG. 2A ignores other connections that go through the package layers. The regulator logic 207 supplies the regulated voltage to the regulated package plane 209 through die metal 206 and package metal 204. The regulated package plane 209 then distributes the regulated voltage from the regulated package plane 209 to the bottom metal 215 on die through package metal vias 204 and die metal vias 206 for use by the circuits of the regulated voltage domain.

Figure 2B:
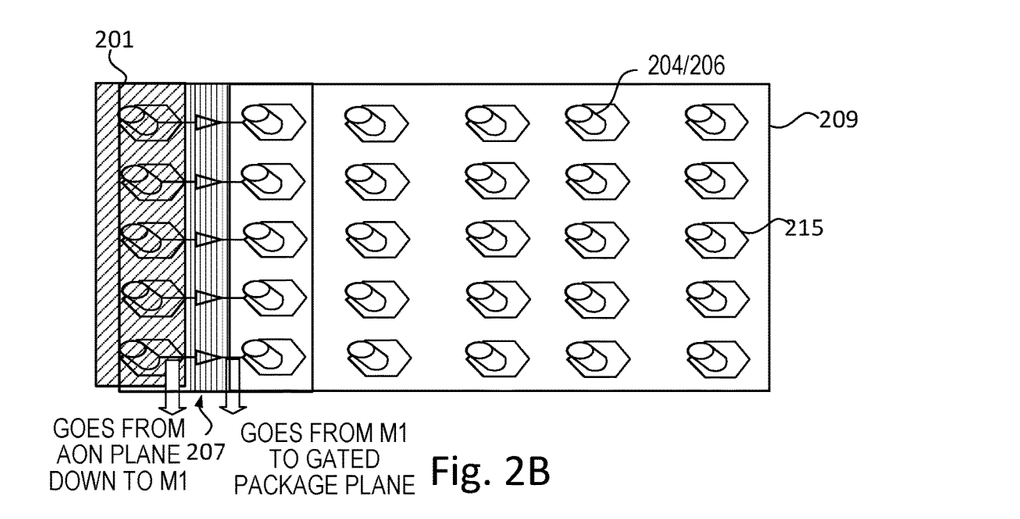
FIG. 2B illustrates another view of an existing monolithic regulation scheme.

FIG. 2B shows another view of the existing regulation scheme where the input unregulated voltage goes from the always on package plane 201 to the metal layer M1 and then back up to a regulated package plane 209 for distribution to the regulated domain through the package metal vias 204 and die metal vias 206. If the regulated package plane 209 gets too large, the impedance eventually degrades the regulated voltage due to IR drop, and the regulation no longer functions effectively. That is, circuits close to the regulator logic 207 see a higher voltage than the circuits farthest away from the regulator. Thus, monolithic on die regulators cannot be scaled effectively. In addition, regulation adds cost because of the extra package layers, such as regulated package plane 209, needed to distribute the regulated voltage.

Figure 3:
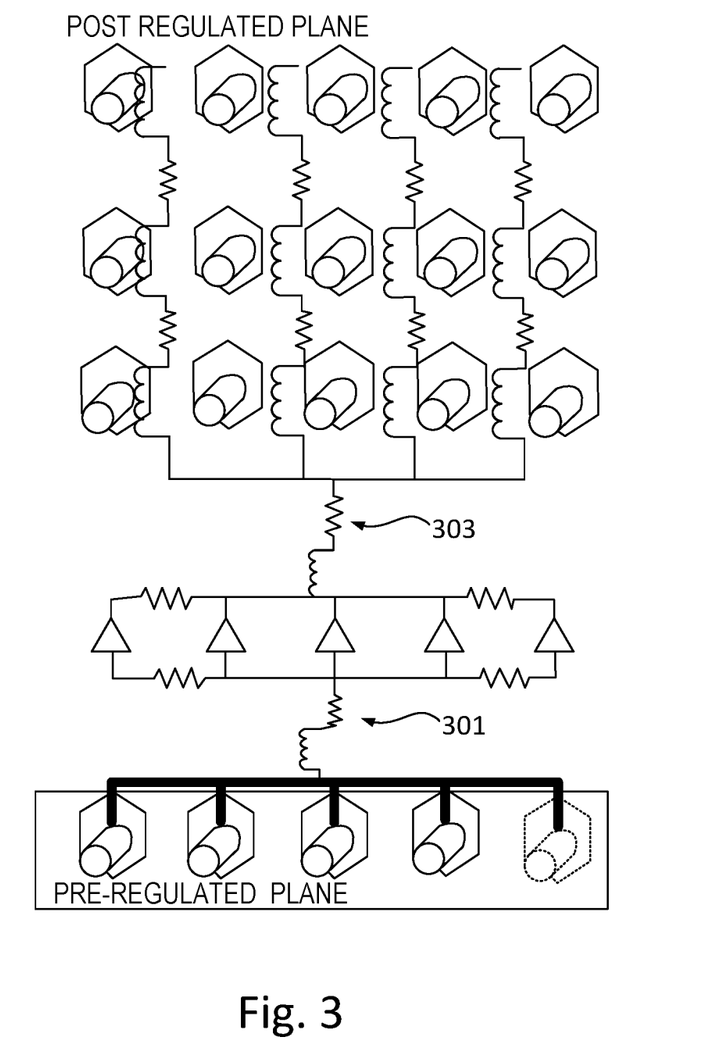
FIG. 3 illustrates bottlenecks associated with existing regulation schemes.

FIG. 3 illustrates another shortcoming of the monolithic regulators, which often form an electromagnetic (EM) bottleneck (current crowding) at their input 301 and output 303. Monolithic regulator schemes also create local routing congestion if the circuits being powered have many inputs/outputs.

Thus, improvements in voltage regulation is desirable particularly for large regulated structures.

SUMMARY OF EMBODIMENTS OF THE INVENTION

Accordingly, a distributed voltage regulator includes a plurality of switches distributed in an area receiving a regulated voltage. Each of the switches has one of N resistance values, N being an integer. The plurality of switches are coupled to receive an unregulated voltage. A plurality of switch control lines selectively enable selected ones of the switches according to respective values of the switch control lines. Each of the plurality of switches receive one of the switch control lines. The selected ones of the plurality of switches collectively convert the unregulated voltage to the regulated voltage.

The distributed voltage regulator may further include a selector circuit coupled to receive a first group of control lines and a second group of control lines and to supply a selected one of the first group and the second group of control lines as the switch control lines.

The distributed voltage regulator may further include a plurality of droop detector circuits distributed through the area receiving the regulated voltage. Each of the droop detectors circuits is configured to detect when the regulated voltage is below a droop threshold voltage and supply a droop detection indication thereof. The selector circuit selects between the first group of control lines and the second group of control lines according to the droop detection indication.

In another embodiment, a method for generating a regulated voltage includes supplying an unregulated voltage to a plurality of switches distributed in a grid pattern, the grid pattern being over an area being supplied with the regulated voltage. The method further includes supplying each of the plurality of switches with one of a plurality of switch control lines to configure the plurality of switches to generate the regulated voltage from the unregulated voltage.

The method may further include supplying a first group of control lines and a second group of control lines to a selector circuit and supplying a selected one of the first and second group of control lines as the switch control lines.

The method may further include detecting in a droop detector when the regulated voltage is below a droop threshold voltage and supplying a droop detection signal indicative thereof and selecting one of the first group of control lines and the second group of control lines in the selector circuit as the switch control lines according to the droop detection signal.

In another embodiment, a distributed voltage regulator includes a plurality of switches distributed in a grid pattern across an area receiving a regulated voltage. Enabled ones of the plurality of switches receive an unregulated voltage and supply the regulated voltage. Each of the plurality of switches has one of a plurality of different resistance values. A plurality of droop detect circuits are distributed through the area receiving the regulated voltage. The droop detect circuits detect when the regulated voltage is below a threshold droop value and supply respective droop detect signals. A plurality of select circuits are coupled to receive a first group of control lines and a second group of control lines and to select one of the first group of control lines and the second group of control lines as switch control lines according to the respective droop detect signals. The plurality of switches are coupled to receive respective ones of the switch control lines.

Another embodiment provides a computer readable medium encoding a computer readable description of a distributed voltage regulator. The distributed voltage regulator includes a plurality of switches distributed in evenly spaced rows in an area receiving a regulated voltage, each of the switches have one of N resistance values, N being an integer. The switches are coupled to receive an unregulated voltage. A plurality of switch control lines are coupled to selectively enable selected ones of the plurality of switches according to values of respective ones of the switch control lines, each of the plurality of switches being coupled to receive one of the switch control lines. The selected ones of the switches collectively convert the unregulated voltage to the regulated voltage.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Embodiments described herein allow on die regulation of very large areas (e.g., 100 mm$^2$) with high current requirements (>20A) using finely distributed standard cell based switches without need for extra package layers. Absent the approach described herein, large areas such as the area of a graphics processing unit (GPU), could not be regulated on die due to its sheer size, current requirements, and the available routing and input/output (I/O) resources. Accordingly, embodiments herein utilize switches widely distributed and embedded in the circuits being regulated.

The switches function as a resistance. The unregulated voltage is supplied to each of the switches. The switches in combination provide the regulation. In an embodiment, between approximately 500,000 and a million distributed switches regulate the voltage. A regulated voltage rail receives switch outputs. Control lines are supplied to the switches to configure the switches into a desired resistor ladder by turning on selected ones of the switches to achieve the target regulated voltage.

Figure 4:
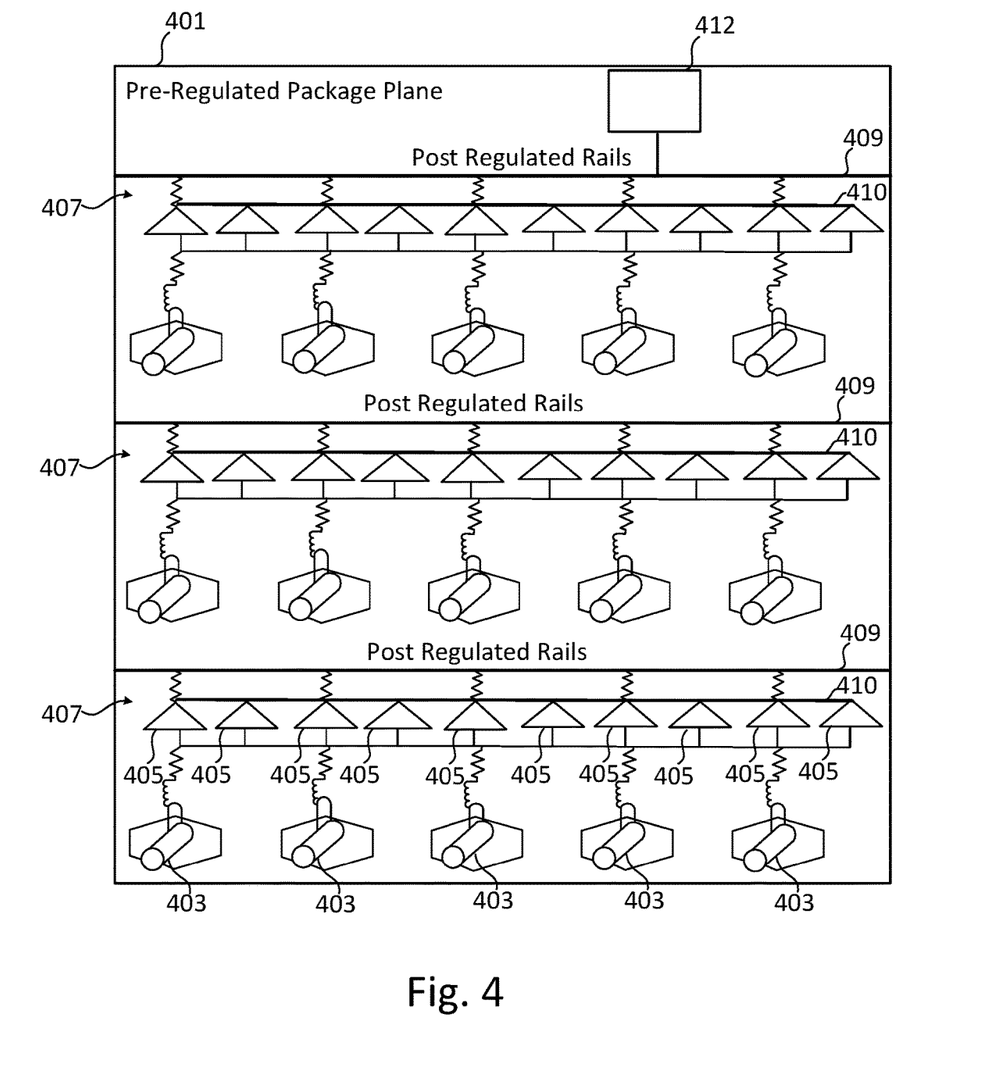
FIG. 4 illustrates a high level diagram of a portion of a distributed voltage regulator according to an embodiment.

FIG. 4 illustrates a high level diagram of a portion of a distributed regulation system. A pre-regulated package plane 401 supplies voltage through vias 403 from the package plane to the switches 405 (only some of which include reference numerals for ease of illustration) embedded in the design. Unregulated rails are distributed globally using one or more package planes 401. However, unlike the system shown in FIGS. 2A and 2B, the unregulated rails supply switches throughout the regulated voltage domain rather than just on its periphery. The global rail is then brought to the regulated devices through local switches 405 that are embedded in with the standard cells for which they provide regulated voltage. FIG. 4 also depicts the resistor-inductor (RL) network from the bumps to the switches and from the switches to the devices in the regulated network.

The switches are placed in rows 407, referred to herein as PGCORE rows. The switches (those that are turned on) reduce the unregulated voltage based on the resistance of the switch and supply the regulated voltage to regulated voltage rail 409. The regulated voltage rail 409 is at a high metal layer (e.g., M11 or higher depending on the process technology) and is supplied to the standard cell devices 412 of the regulated voltage domain through die metal vias (not shown in FIG. 4). The portion 410 of rail 409 illustrates strong local sharing between the switches in one row. The outputs are shorted together at a low metal level, e.g., M2 and then at a higher metal level, e.g., M11. Then there is a regular pattern grid shorting all the switches together. The resistance shown from the switches illustrates resistance associated with the local sharing and the global regulated grid structure. The PGCORE rows 407 receive the unregulated rail. The rows include the switches, droop controllers described further herein, and other logic that requires unregulated voltage. That ensures that the regulator control logic can regulate the voltage even when the regulated voltage rail is shut off. The wide distribution of the switches overcomes the problem of IR drop as the regulated voltage is being generated throughout the area being regulated.

Figure 5A:
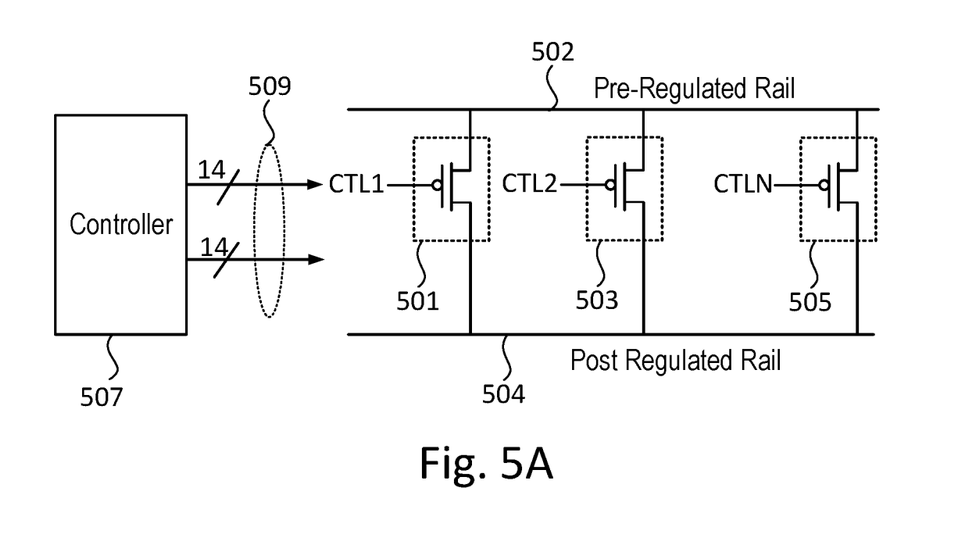
FIG. 5A illustrates an example of switches associated with a distributed regulation scheme.
Figure 5B:
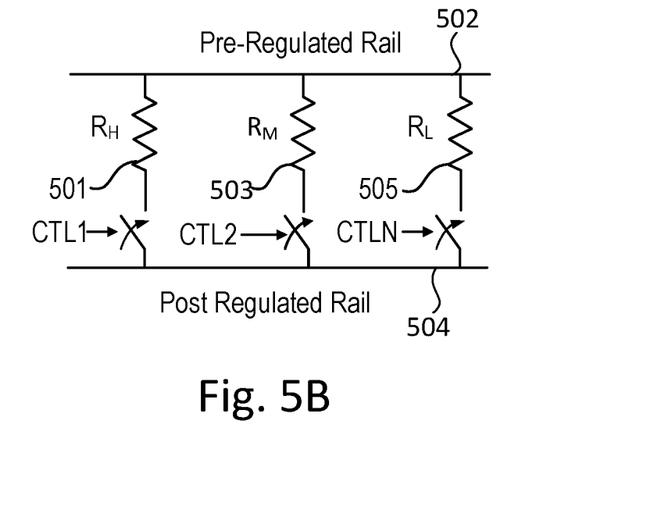
FIG. 5B illustrates a conceptual view of switches associated with a distributed regulation scheme.

Referring to FIGS. 4 and 5A, each switch 405 may represent a specific resistance. In one embodiment, each switch 405 has one of three resistances, high, medium, and low. By way of example, the high resistance switch 501 is~5K ohms, the medium resistance switch 503 is~1.5K ohms, and the low resistance switch 505 is~40 ohms. The switches 501, 503, and 505 receive the pre-regulated voltage 502 and supply at their outputs, which are shorted together, the regulated voltage 504. FIG. 5B illustrates a conceptual view of the switches as high (RH), medium (RM), and low (RL) resistances. The controller 507 turns on/off the distributed switches 405 using control lines 509 supplied to the switches that are distributed across the chip using a buffer (redrive) network coupled to the unregulated power. Thus, for example, switch 501 receives one of control lines 509 as CTL1 to selectively enable the switch 501, switch 503 receives one of the control lines 509 (CTL2) to selectively enable the switch 503, and switch 505 receives one of the control lines (CTLN) to selectively enable the switch 505.

As explained further herein, the controller 507 supplies two sets of control lines to an intermediate droop controller rather than directly to the switches. The buffers redrive the control signals to achieve desired signal strength and timing to the droop controllers.

The switches and other portions of the voltage regulator system that are powered by the input rail of the regulator and the devices that use the output voltage of the regulator reside in the same space. The wells of both regulated standard cells and the switches connect to the unregulated rail. If the wells of the regulated standard cells were not coupled to the unregulated rail, shutting off the regulated rail would result in floating wells. In addition, maintaining two wells, one connected to the regulated rail and one connected to the unregulated rail would waste area due to the need to maintain wide well spacing. The control bus drivers either reside in small voltage islands that receive the unregulated voltage or they are placed in the dedicated rows along with the switches. Such an implementation approach allows the distribution of the switches across the regulated voltage domain.

While each switch is shown as one PMOS transistor in FIG. 5A, each switch may be formed of multiple field effect transistors (FETs). In an embodiment 14 signal lines control the switches at any one time. The switches form a resistor ladder configured to achieve the desired voltage drop between the input unregulated voltage and the output regulated voltage. Each switch receives only one of the fourteen control signals. The number and location of the switches for each signal is controlled to achieve the target resistance ladder required to allow the regulator to achieve the desired voltage drop.

The controller provides control functionality to control the voltage regulation to achieve a desired regulation based on a target voltage. For example, the input voltage may be 1.8V and the target regulated voltage is 1.6V. In an embodiment, the controller provides the functionality described in application Ser. No. 14/720,385, filed May 22, 2015, entitled "Droop Detection for Low-Dropout Regulator" naming Miguel Rodriguez et al. as inventors, Pub. No.: US 2016/0342166; and in application Ser. No. 14/919,364, filed Oct. 21, 2015, entitled "Droop Detection and Regulation for Processor Tiles" naming Miguel Rodriguez et al. as inventors, Pub. No.: US 2016/0342185, which application is incorporated herein by reference in its entirety. As described earlier, embodiments of the controller include a slow control loop to respond to more slowly changing voltage requirements and a fast control loop to respond to sudden loading. Power supply monitors are sparsely distributed through the design (as compared to droop controllers discussed further herein) to detect the level of the regulated voltage and supply an indication of the regulated voltage back to the controller. The controller uses the difference between the regulated voltage and the target regulated voltage to adjust the control bits to achieve a higher or lower regulated output voltage as needed in the slow control loop. In an embodiment, the controller is implemented as a finite state machine. The control logic knows the appropriate control bit code for the control lines corresponding to a particular target voltage and how to adjust the measured voltage to achieve the target voltage. The most significant bit of the 14 bit control lines controls high resistance switches. The least significant bit controls low resistance switches. There are more low resistance switches than medium resistance switches and more medium resistance switches than high resistance switches.

The number and type of switches controlled by each control line depends on the particular parameters of the voltage regulation scheme. Generally, the more significant bits of the control lines control fewer switches than the less significant bits.

Figure 6:
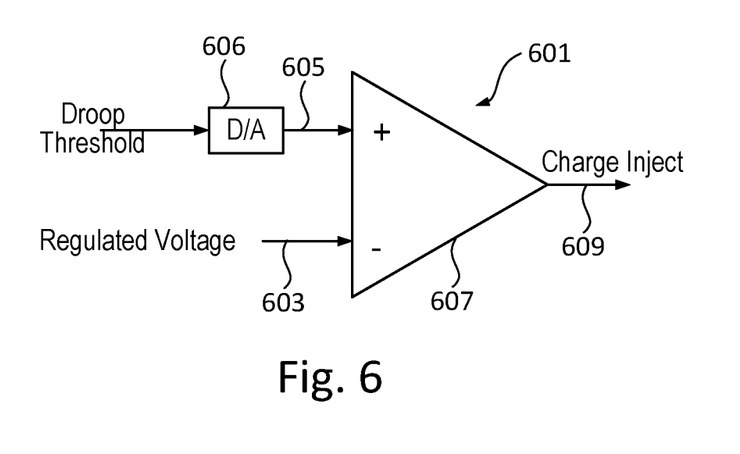
FIG. 6 illustrates an example of a droop detector.

In addition, embodiments include droop detector circuits and droop control circuits. The droop detector circuits are distributed regularly through the regulated voltage domain to achieve good coverage and detect when the regulated voltage has dropped below a target droop threshold voltage value. FIG. 6 illustrates an example of a droop detector 601. When the sampled regulated voltage 603 drops below the target droop threshold voltage value 605, the comparator 607 asserts a charge inject signal 609. The controller 507 supplies the droop threshold voltage value as a digital value and droop detector 601 converts the digital value to an analog value in digital to analog converter 606. The droop detector is a macro and each tile has one droop detector. The droop detector is placed, like any other macro, closer to the edge of the tile, depending on the floorplan of the specific tile.

A tile is a subsection of the design that is placed and routed by itself and then gets embedded into the rest of the design. Tiles are defined as the entire chip is partitioned into subsections. Tiles also represent a physical hierarchy. Tiles can vary in size ranging from a few hundred thousand standard cells to greater than 1 million standard cells. Tiles of different sizes have a different number of switches, e.g., approximately 3K to 6K switches. Switches are distributed in a regular x/y pitch in the PGCORE rows, which are also distributed in the tile in a regular y pitch (~30 um y distance). In an embodiment, each tile, regardless of tile size, has one droop detect circuit. An example design has approximately 100 tiles. Other designs can of course have a different number of tiles. In an embodiment, all tiles are coupled to a single regulated domain.

Figure 7:
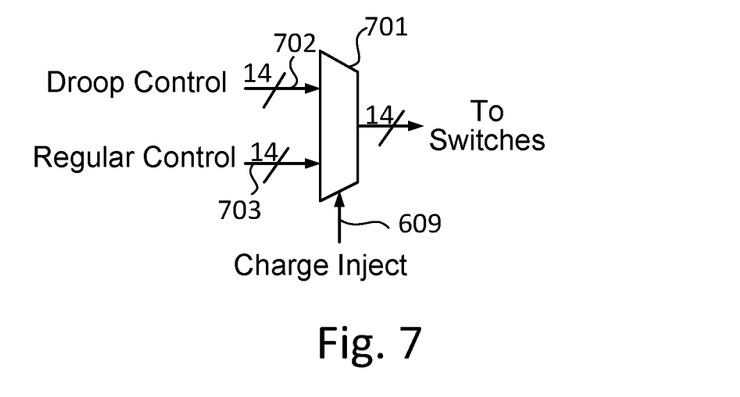
FIG. 7 illustrates an embodiment of a droop control circuit.

FIG. 7 illustrates an embodiment of a droop control circuit 701. The droop control circuit 701 functions as a multiplexer and selects between droop control bits 702 and regular control bits 703. Controller 507 (see FIG. 5) supplies both the droop control bits and the regular control bits. The regular control bits 703 set the voltage domain to operate at a voltage level determined by, e.g., the power state of the system or are updated in response to change in measured voltage from the power supply monitors due to temperature. The droop control bits 702 cause the system to respond to a sudden increase in system load. When the droop detector 601 detects a voltage droop caused by the sudden increase in system load and asserts the charge inject signal 609, the asserted charge inject signal causes the multiplexer 701 to select the droop control bits. In an embodiment the controller 507 sets the droop control bits to be some percentage, e.g., 10% above the regulated voltage value of the regular control bits, to inject charge into the regulated voltage to stabilize the regulated voltage. Thus, in response to the voltage droop, more switches are turned on to increase the regulated voltage by reducing the overall resistance of the switches forming the regulator. The charge injection stops when the droop detector deasserts the charge inject signal 609 in response to the regulated voltage returning back to being above the droop threshold voltage. The droop controllers also reside in the PGCORE rows and receive unregulated voltage. The droop controller is a standard cell placed in the PGCORE rows in an array pattern. The number of droop controllers can vary just like the switches. Droop controllers are placed at a predefined x/y pitch in the tile. In an embodiment, each tile has from 20 to 50 droop controllers and each droop controller controls approximately 50 to 100 switches.

Figure 8:
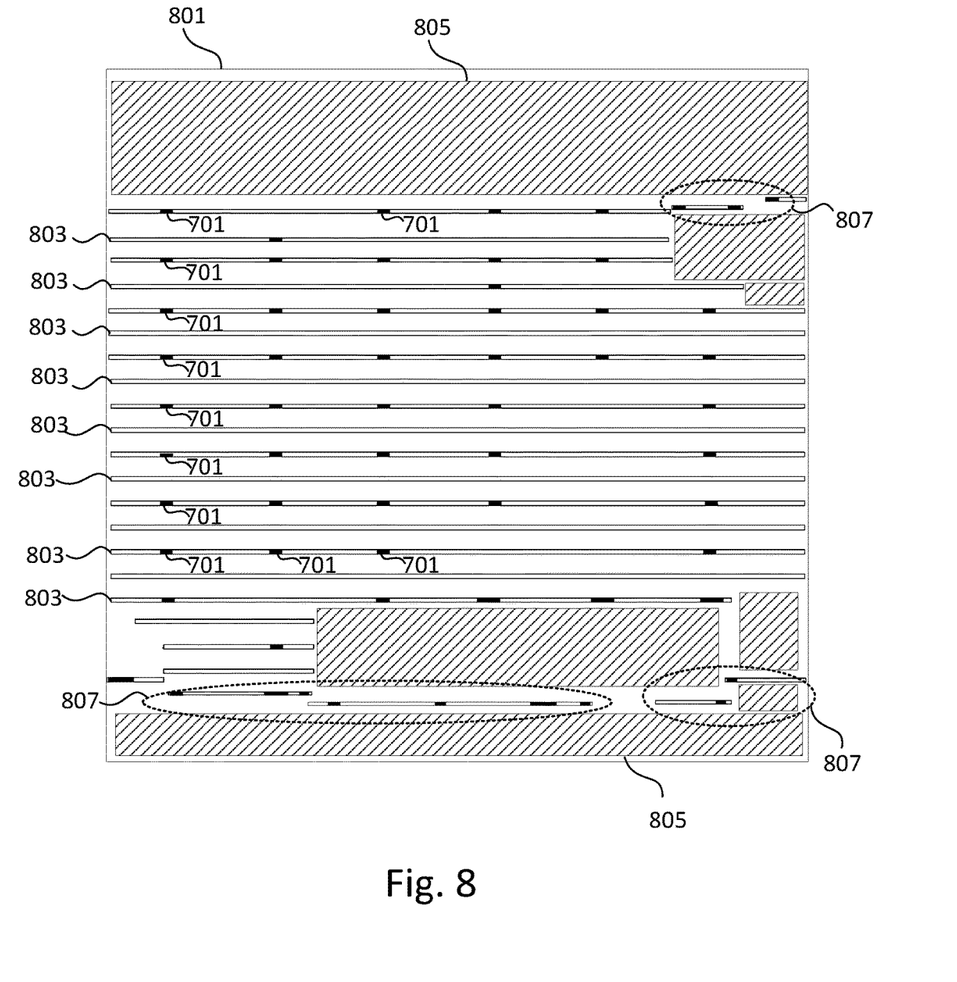
FIG. 8 illustrates distribution of the switches and the droop control circuits in rows across the area being regulated.

FIG. 8 further illustrates distribution of the regulator switches in a tile 801. The switches are distributed in PGCORE rows 803 (corresponding to PGCORE rows 407 in FIG. 4) across the tile. While FIG. 8 shows one tile or a portion thereof, the entire area being regulated may be approximately 10,000 microns by 10,000 microns, which is approximately the dimensions of current graphics processing units (GPUs). In an embodiment, the rows have a pitch of approximately 20-30 microns and thus a GPU utilizing the distributed regulator switches described herein has approximately 300-500 rows of switches. FIG. 8 also illustrates the droop controllers 701 evenly distributed in an array pattern through the PGCORE rows. Like the switches, the droop controllers need to be evenly distributed across the area being regulated to ensure good coverage. The timing from the droop controllers to the switches should be tightly matched to prevent wide voltage differences being created across the tile. Accordingly, in an embodiment, each droop controller connects to switches within a 100 μm radius.

As shown in FIG. 8, not all of the area of an integrated circuit is regulated. The shaded areas 805 represent unregulated areas in which power is always on (AON). Such AON areas block both the switch rows and other standard cells. Such blockage regions include, e.g., phase-locked loops providing clocks, random access memory, and other non-standard cell design areas. In view of the blockages that occur, certain rows 807 that are shorter than full rows are created in thin channels between non-standard cell design areas. In such rows, the normal 20-30 micron pitch does not apply. The thin rows ensure local switches are available for standard cells that use the thin channels between the macros. The thin channel coverage may also provide power for SRAMs or other non-standard logic that uses regulated voltage.

Figure 9:
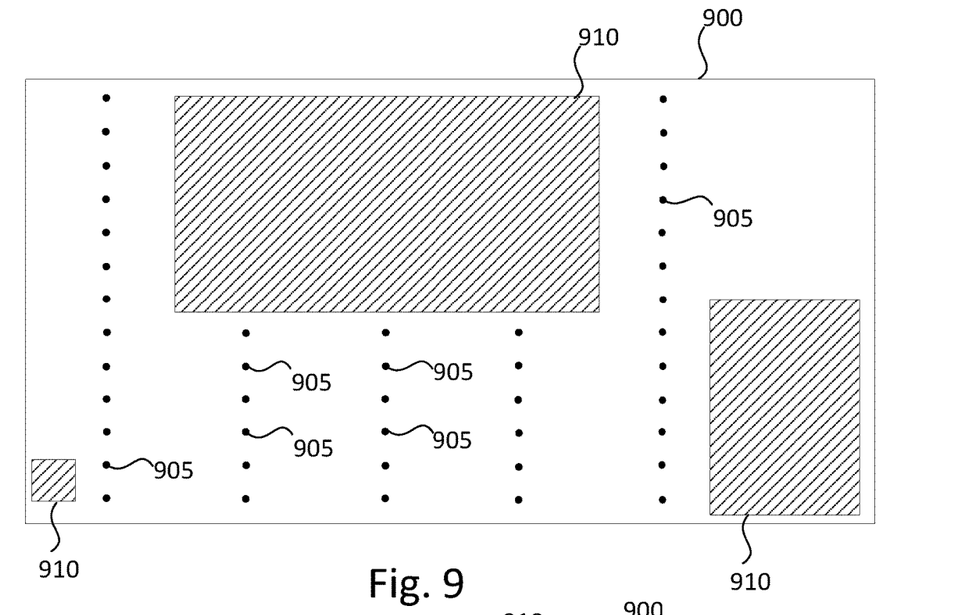
FIG. 9 illustrates the distribution of the switches of a first resistance value in a grid pattern across the area being regulated.
Figure 10:
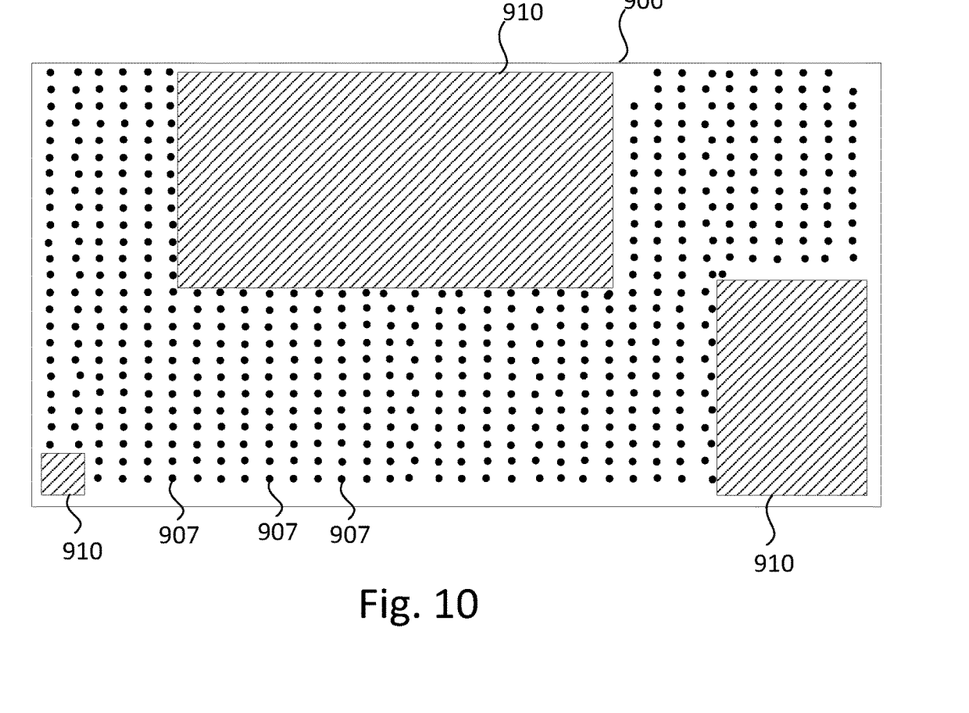
FIG. 10 illustrates the distribution of the switches of a second resistance value in a grid pattern across the area being regulated.

The switches are formed in the same region the standard cells are formed and distributed throughout the region being regulated. FIGS. 9 and 10 illustrate distribution of the switches through the tile 900. FIG. 9 shows the distribution of switches that may be coupled to one of the more significant bits of the control lines, e.g., bit 0 or bit 1, which typically couple to the high resistance switches. The switches 905 (only some of which have reference numerals for ease of illustration) are distributed in a grid pattern that provides a substantially even distribution of switches over the area being regulated. Where blockages occur, such as at 910, no switches are present. As stated earlier, each switch is controlled by one of the control lines from the droop controller.

In an embodiment, the significance of the bit of the control line is inversely related to the number of switches to which the control bit is coupled. Thus, the most significant bit of the 14 bit control word controls 10-100 high resistance switches per tile. The least significant bit of the control word controls thousands of low resistance switches depending on tile size and floorplan. Each bit of the intermediate control bits controls a number of switches that is between the number of switches associated with its immediate neighboring control bits. As stated earlier, a tile has between approximately 3K and 6K switches, with the specific number of switches varying per tile size and floorplan. Other embodiments may not have a linearly increasing number of switches coupled to the control lines but rather ensure that the controller can configure a resistance ladder to provide the target regulated voltages required by the particular system by achieving the target switch count for each bit.

FIG. 10 shows the distribution of lower resistance switches 907 that may be coupled to, a less significant bit of the control lines, e.g., bit 14. The switches 907 (only some of which have reference numerals for ease of illustration) are also distributed in a grid pattern that provides a substantially even distribution of switches over the area being regulated. Where blockages occur, such as at 910, no switches are present. The even distribution of switches ensures no significant voltage drop between where the regulated voltage is generated and where the regulated voltage is used due to the uniform distribution of the switches. The approach described herein utilizes a fine grain distribution of switches to achieve voltage regulation. That fine grain distribution, exemplified by a 10,000×10,000 micron area being regulated having at least approximately 500K to approximately a million switches distributed in approximately 300-500 evenly spaced rows throughout the regulated portion of the design. Each tile of the area has approximately 3K to 6K switches and the chip top level hierarchy has approximately 50K switches.

While not specifically shown in FIG. 9 or 10, based on the required response time and the area that needs to be spanned for the control signals, repeater flip-flops are inserted based on the controller clock frequency to achieve the synchronous distribution of the control signals as required by the particular design. The higher the clock frequency, the more flip-flops may be required.

Thus, on die regulation with fine grain distribution of switches obviates the need for extra package rails to distribute the regulated voltage. Current bottlenecks into and out of the regulator circuit are eliminated since the current is distributed over thousands of switches per tile. Importantly, the solution scales to larger coverage areas so long as the control signals can be satisfactorily distributed to satisfy the response requirements. The distributed regulation eliminates the voltage delta as you go farther away from the regulator that would be present in the solution shown in FIG. 2A. The fine grain distribution eliminates local congestion where all metal layers are heavily used in the vicinity of a centralized solution. Standard logic can connect to regulated voltage rails while the switches, control buffers, and droop controllers that reside in the same area connect to the unregulated voltage. Note that the switches for each control bit are evenly distributed across a given design area to ensure proper power delivery.

While circuits and physical structures are generally presumed for some embodiments, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. Embodiments are contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium.

Thus, embodiments for a distributed voltage regulation scheme has been described. The description set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A distributed voltage regulator comprising:
a plurality of switches distributed in an area receiving a regulated voltage, each of the switches have one of N resistance values, N being an integer, the switches coupled to receive an unregulated voltage;
a plurality of switch control lines coupled to selectively enable selected ones of the plurality of switches according to values of respective ones of the switch control lines, each of the plurality of switches being coupled to receive one of the switch control lines, the selected ones of the switches to collectively convert the unregulated voltage to the regulated voltage; and
a selector circuit coupled to receive a first group of control lines and a second group of control lines and to supply a selected one of the first group and the second group of control lines as the switch control lines.

2. The distributed voltage regulator as recited in claim 1 further comprising:
a plurality of droop detector circuits distributed through the area receiving the regulated voltage, each of the droop detector circuits configured to detect when the regulated voltage is below a droop threshold voltage, thereby indicating a sudden increase in system load, and supply a droop detection indication thereof; and
wherein the selector circuit selects the first group of control lines responsive to the droop detection indication being asserted and selects the second group of control lines responsive to the droop detection indication being unasserted, the droop detection indication being supplied by one of the droop detector circuits.

3. The distributed voltage regulator as recited in claim 1 further comprising:
a controller to supply the first group of control lines and the second group of control lines to the selector circuit.

4. The distributed voltage regulator as recited in claim 1 wherein the selector circuit is coupled to receive the unregulated voltage.

5. The distributed voltage regulator as recited in claim 1 further comprising:
wherein the switches are distributed in a fine grain pattern in evenly spaced rows through the area being supplied the regulated voltage, the evenly spaced rows being approximately 20-30 microns apart.

6. The distributed voltage regulator as recited in claim 1 wherein:
a first group of the plurality of switches having a first resistance value of the N resistance values are distributed in a first grid pattern through the area receiving the regulated voltage; and
wherein a second group of the plurality of switches having a second resistance value of the N resistance values are distributed in a second grid pattern through the area receiving the regulated voltage.

7. The distributed voltage regulator as recited in claim 1, wherein a first control line corresponding to a most significant bit of the switch control lines is coupled to a first number of switches having a first resistance; and
wherein a second control line corresponding to another bit of the switch control lines is coupled to a second number of switches having a second resistance, the second resistance being lower than the first resistance and the second number being greater than the first number.

8. The distributed voltage regulator as recited in claim 1 further comprising:
buffers to redrive the switch control lines, the buffers coupled to the unregulated voltage.

9. The distributed voltage regulator as recited in claim 1 wherein:
the regulated voltage supplied by the switches is directly coupled to first logic being supplied the regulated voltage, the first logic being adjacent to the switches; and
wherein the regulated voltage supplied by the switches is coupled to an upper metal layer and supplied to second logic being powered by the regulated voltage through the upper metal layer.

10. A method for generating a regulated voltage comprising:
supplying a plurality of switches distributed in a grid pattern with an unregulated voltage, the grid pattern being over an area supplied with the regulated voltage;
supplying each of the plurality of switches with one of a plurality of switch control lines to configure the plurality of switches to generate a desired regulated voltage from the unregulated voltage;
supplying a first group of control lines and a second group of control lines to a selector circuit; and
supplying a selected one of the first and second group of control lines as the switch control lines.

11. The method as recited in claim 10 further comprising:
detecting in a droop detector circuit when the regulated voltage is below a droop threshold voltage and supplying a droop detection signal indicative thereof; and
selecting one of the first group of control lines and the second group of control lines in the selector circuit as the switch control lines according to the droop detection signal.

12. The method as recited in claim 10 further comprising:
supplying the selector circuit with the unregulated voltage.

13. The method as recited in claim 10 further comprising:
supplying the selector circuit with the first group of control lines and the second group of control lines from a control circuit.

14. The method as recited in claim 10 further comprising:
configuring a first plurality of the switches having a first resistance value to be on according to the desired regulated voltage; and
configuring a second plurality of the switches having a second resistance value to be on according to the desired regulated voltage.

15. The method as recited in claim 10,
supplying a first switch control line of the switch control lines to a first number of the switches having a first resistance; and
supplying a second switch control line of the switch control lines to a second number of the switches having a second resistance, the second resistance being lower than the first resistance and the second number of the switches being at least an order of magnitude greater than the first number of the switches.

16. The method as recited in claim 10 further comprising:
supplying the unregulated voltage to a plurality of buffers; and
redriving the switch control lines with the buffers.

17. The method as recited in claim 10 further comprising:
supplying the regulated voltage from the switches directly to first logic adjacent to the switches in the area receiving the regulated voltage; and
supplying the regulated voltage from the switches to a voltage rail in a metal layer; and
supplying the regulated voltage from the voltage rail through vias to second logic in the area receiving the regulated voltage.

18. The method as recited in claim 10 further comprising generating the regulated voltage from enabled ones of the plurality of switches collectively.

19. A distributed voltage regulator comprising:
a plurality of switches distributed in a grid pattern across an area receiving a regulated voltage, enabled ones of the plurality of switches coupled to receive an unregulated voltage and supply the regulated voltage;
wherein each of the plurality of switches has one of a plurality of different resistance values;
a plurality of droop detect circuits distributed through the area, the droop detect circuits to detect when the regulated voltage is below a threshold droop value and supply respective droop detect signals; and
a plurality of select circuits, each of the select circuits coupled to receive a first group of control lines and a second group of control lines and to select one of the first group of control lines and the second group of control lines as switch control lines according to the respective droop detect signals, the plurality of switches coupled to receive respective ones of the switch control lines.

20. At least one non-transitory computer readable medium encoding a computer readable description of a distributed voltage regulator, the distributed voltage regulator including:
a plurality of switches distributed in evenly spaced rows in an area receiving a regulated voltage, each of the switches have one of N resistance values, N being an integer, the switches coupled to receive an unregulated voltage;
a plurality of switch control lines coupled to selectively enable selected ones of the plurality of switches according to values of respective ones of the switch control lines, each of the plurality of switches being coupled to receive one of the switch control lines, the selected ones of the switches to collectively convert the unregulated voltage to the regulated voltage;
a droop detect circuit to detect when the regulated voltage is below a threshold droop voltage value and supply a droop detect signal; and
a selector circuit coupled to receive a first group of control lines and a second group of control lines and to supply a selected one of the first group and the second group of control lines as the switch control lines according to a value of the droop detect signal.

* * * * *

UNITED STATES PATENT AND TRADEMARK OFFICE
CERTIFICATE OF CORRECTION

PATENT NO. : 10,218,273 B2  
APPLICATION NO. : 15/632765  
DATED : February 26, 2019  
INVENTOR(S) : Erhan Ergin et al.

Page 1 of 1

It is certified that error appears in the above-identified patent and that said Letters Patent is hereby corrected as shown below:

In the Claims

In Claim 5, Line 2, please delete "further comprising:"
In Claim 15, Line 1, please add --further comprising:-- after "claim 10,"

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*